Dec. 6, 1938.   L. M. BUTTERFIELD   2,139,574
EGG GRADING MACHINE
Filed Jan. 14, 1937   2 Sheets-Sheet 1

Inventor
L. M. Butterfield
By L. F. Randreth
Attorney

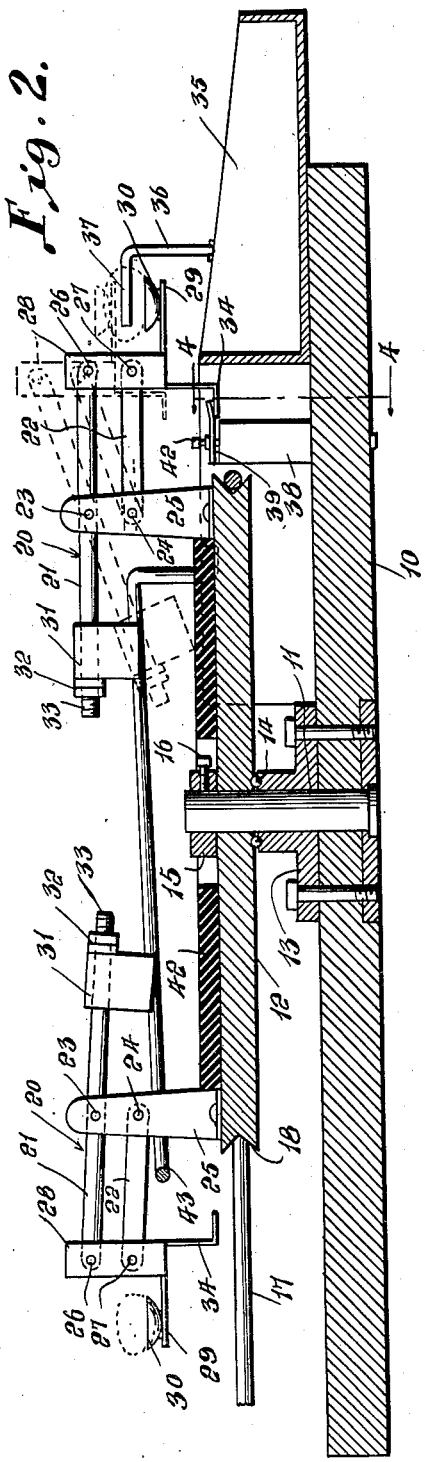
Dec. 6, 1938. L. M. BUTTERFIELD 2,139,574
EGG GRADING MACHINE
Filed Jan. 14, 1937 2 Sheets-Sheet 2
Inventor
L. M. Butterfield Patented Dec. 6, 1938

2,139,574

UNITED STATES PATENT OFFICE 2,139,574

EGG GRADING MACHINE

Louis M. Butterfield, Kittery, Maine

Application January 14, 1937, Serial No. 120,611

1 Claim. (Cl. 209—121)

This invention relates to a grading machine primarily adapted to grade eggs according to the weight thereof.

It is particularly aimed to provide a novel machine wherein the eggs are automatically graded and sorted following their supply to the machine.

It is further aimed to provide such a construction which may utilize scales and as many of them as desired.

The invention resides in the combinations, details and the like disclosed in the operative embodiment of the accompanying drawings wherein:—

Figure 2 is a diametric sectional view taken substantially on the line 2—2 of Figure 1;

Figure 3 is a detail section taken on the line 3—3 of Figure 1, and

Figure 4 is a sectional view taken on the line 4—4 of Figure 2.

Figure 1:
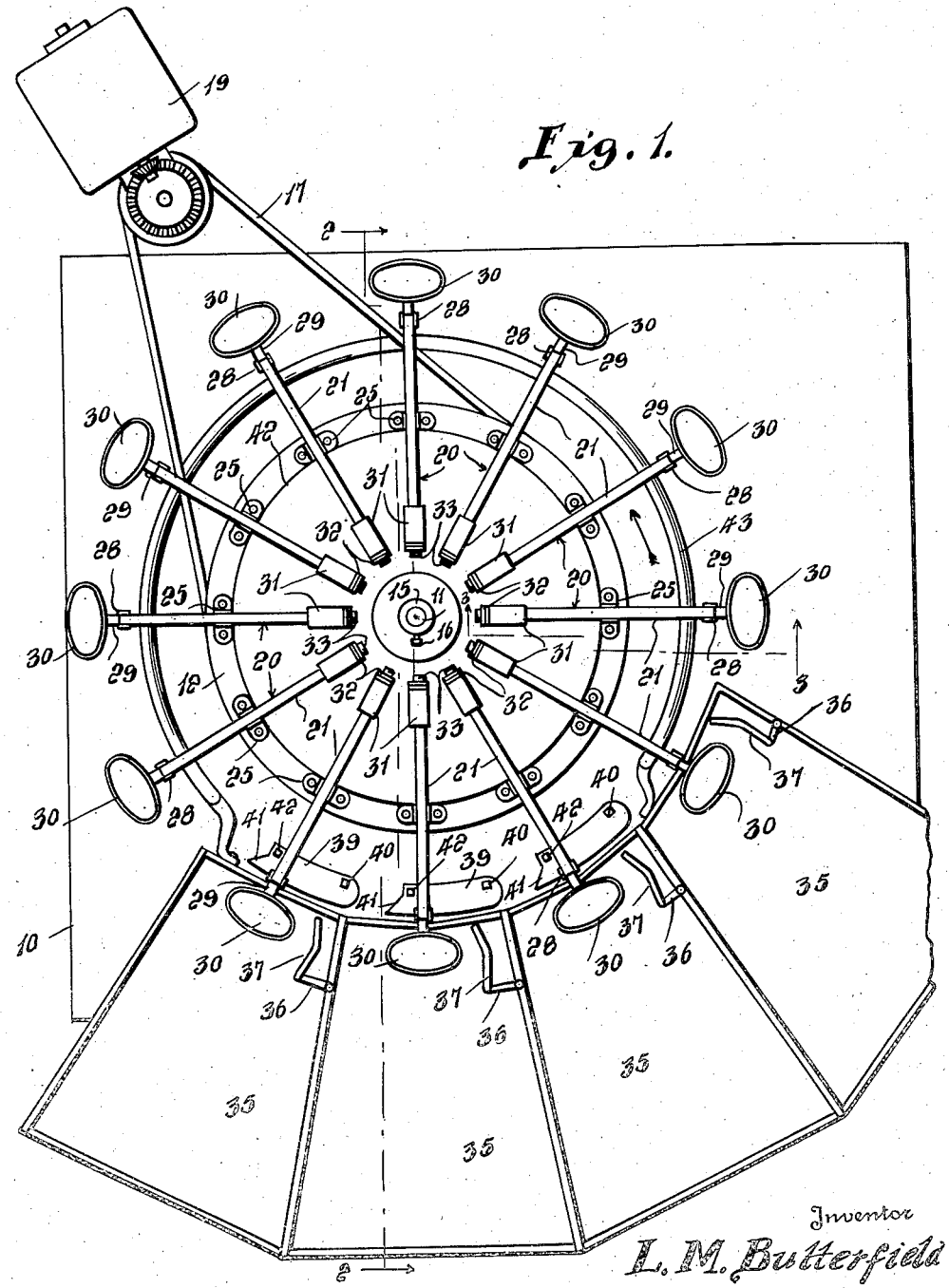
Figure 1 is a plan view of the machine.

Referring specifically to the drawings wherein like reference characters designate like or similar parts, the machine may employ a bed or supporting plate 10 adapted to be stationarily supported or mounted in any suitable manner. Suitably fastened to the base plate or bed 10 in a stationary manner is a vertical stud 11 on which a disk or rotor 12 is journaled, the latter resting upon a bearing plate 13 which aids in mounting the stud 11 and between which bearing plate 13 and disk 12, bearings 14 are interposed to reduce friction. A collar 15 is removably fastened at 16 to the stud 11 above the disk 12. The disk or plate 12 is round and is adapted to be rotated in any suitable manner as through the medium of an endless belt 17 operating in a groove 18 of the periphery of the disk 12 and driven from any suitable source of power, such as an electrical one as conventionally shown at 19. The plate or rotor 12, by reason of the groove 18 is in effect a pulley.

Arranged equidistantly around the rotor 12 are scales generally designated 20. Each scale 20 is a separate and independent unit and as many of them may be employed as desired. Specifically, such scales consist of upper and lower parallel beams 21 and 22, being pivoted at 23 and 24, respectively, to brackets 25 rigidly attached to the rotor. Said beams 21 and 22 at 26 and 27, are pivotally connected to brackets 28, the same having shelves 29 thereon provided with cups or holders 30 in which eggs or the like may be deposited. Adjustably mounted adjacent the free end of each of the beams 21 is a poise 31, the same being engaged by nuts 32 threaded at 33 onto the beams 21, to permit the said adjustment. L-shaped fingers 34 depend from the brackets 28.

Suitably secured to the bed 10 are any desired number of receptacles, bins, or trays 35 into which the eggs of the different grades are adapted to be deposited, it being clear that the receptacles 35 may be lined or provided with soft material such as excelsior, to cushion eggs which may be deposited into the same, the eggs being adapted to abut L-shaped ejector arms 36, fastened to the receptacles or adjacent thereto as shown, such ejector arms having lateral fingers 37.

The eggs or articles to be graded are adapted to be placed in the cups 30 as the latter leave the right hand bin or receptacle 35 in Figure 1 and the eggs in proporton to their weight, are adapted to be removed from the bins from left to right in Figure 1, those heaviest in weight being removed in the left hand bin, those of the next heavier grade in the next bin, and so on, with the lightest eggs being removed in the right hand bin in Figure 1.

Associated with each bin and suitably mounted on the bed plate 10 is a block 38 having depressor bars 39 fastened thereto as at 40. Such bars project beyond the blocks 38, are of resilient metal and have free ends deflected upwardly as at 41. Screw threaded to the depressor bars 39 are screw members 42 which are adjustable therethrough and engageable with the blocks 38 so that the height of the portions 41 may be adjusted in a vertical plane. Such depressor bars 39 also project laterally throughout their length beyond one side of the blocks 38 as best shown in Figure 2.

In order to prevent undue teetering of the scales on the application of the eggs into the cups 30, and thereafter, a cam rod 43 is fastened to the bed plate, the same being highest at the right hand bin 35, and then inclining or gradually decreasing in height throughout the length of the rod 43 and toward the other end which terminates adjacent the left hand receptacle 35. When the eggs are placed in the cups 30, the lowermost beams 22 rest on the said guard rod 43, as best shown in Figure 3.

Presuming operation, with the rotor 12 turning counterclockwise, the eggs or other articles to be graded are placed in the cups 30 as they leave the right hand receptacle 35. Turning counterclockwise the weight of the egg keeps the lower bar 22 of the scales in contact with the cam rod 43 to a point where the scale no longer contacts it because of the gradual diminishing height of the cam rod.

The heaviest eggs in the cups 30 keep the scales in contact with the cam rod 43 for a greater distance than lighter ones do.

Now the scales carrying the heaviest eggs in their egg cups 30 are travelling low and the depressor bar 39 at the left hand egg tray is set the lowest. The succeeding ones from left to right are each set a little higher. Thus in operation the heaviest eggs are removed in the first or left hand tray 35, the next heaviest in the next tray toward the right and so on until any very light eggs still on the cups are removed by the rigid ejecting arm 36 at right hand end of tray 35.

The cam rod 43 should terminate at a point near the right hand edge of the left hand egg tray 35 and between the depressor bar and the rotor. This is to keep the egg scales carrying extreme heavy eggs, such as double yolked ones, in contact with the cam rod 43 until they are removed by the ejector arm 36 at that tray.

There is a depressor bar 39 and an ejector arm 36 at each tray except the last which has only an ejector arm 36. The eggs in the scale cups 30 according to their weight depress the scales until the L-shaped fingers 34 on the bottom of the scales pass under the point 41 of the depressor bar.

The finger or hook travels along the depressor bar the same as a cam downwards until the egg contacts the ejector arm which removes the egg into the tray. Immediately after the egg is removed the hook comes out under the right hand end of the depressor bar and the egg cup now being empty, comes up to its normal position.

The ejector arm is adjusted higher than the depressor bar point 41 at each egg tray. This is to provide clearance for the egg cup over the ejector arm, for eggs not quite heavy enough so that the hook contacts the depressor bar at that tray.

It will be realized that the weight limits of the eggs will be known and that the poises 31 of the scales may be adjusted beforehand to accord with the weights to be graded into the different bins and that there is adjustment as to the grades, due to the fact that the screws 42 are operable to raise or lower the ends 41 of the depressor bars 39.

Pads or cushions as of rubber, felt or the like may be provided at 42, to avoid shock to the apparatus when the eggs are removed from the scales, since they cushion the contact of the poises therewith.

It will be readily understood that the number of grades into which the eggs may be separated will be determined by the number of depressor bars 39 and trays 35 used and I, therefore, do not limit myself to the number of depressor bars and trays as shown, as the number may be increased or diminished as desired.

Various changes may be resorted to provided they fall within the spirit and scope of the invention.

I claim as my invention:—

A grading apparatus of the class described comprising a stationary support, a rotatable body mounted on said support, scales carried by said body to weigh and carry elements to be graded, a plurality of grading stations in a group on said stationary support, a feeding station in advance of the grading stations, ejector means at each grading station relatively to which the body moves operable to eject elements from the scales through such movement according to their weight, said scales comprising a support member, parallel beams pivoted to the support member, element-carrying brackets pivoted to both beams, each bracket having a downwardly depending L-shaped finger, a plurality of adjustable scale positioning means to progressively lower the brackets when the elements to be graded at a station are below a predetermined weight so as to hold the scales in proper position relative to each ejector means, each of said positioning means located at progressively increasing elevations, said scale positioning means each having a depressor bar fixed at one end on said stationary support and engageable by said fingers along their under surfaces, each ejector being located adjacent a depressor bar, means operable to vary the elevation of the free end of each bar, and a cam track on said stationary support sloping downwardly from the feeding station to the grading stations on which the lower beams of the scales travel under the weight of the elements to be graded to prevent undue lowering of the scales and insure initial grading of the heaviest elements and progressive grading of succeeding lighter elements.

LOUIS M. BUTTERFIELD.